(12) United States Patent
Wu

(10) Patent No.: US 8,480,385 B2
(45) Date of Patent: Jul. 9, 2013

(54) WATERPROOF AND DUSTPROOF FAN MOTOR STRUCTURE AND FAN USING THE SAME

(75) Inventor: Bill Wu, Sinjhuang (TW)

(73) Assignee: Asia Vital Components Co., Ltd., Sinjhuang, Taipei County ( * ) Notice: Subject to any disclaimer, the term of this patent is extended or adjusted under 35 U.S.C. 154(b) by 293 days.

(21) Appl. No.: 12/954,620

(22) Filed: Nov. 25, 2010

(65) Prior Publication Data

US 2012/0134792 A1    May 31, 2012

(51) Int. Cl.
*H05K 7/20*      (2006.01)

(52) U.S. Cl.
USPC ............... 417/423.7; 417/423.9; 361/695

(58) Field of Classification Search
USPC ................. 417/423.7, 423.1, 423.9; 361/695
See application file for complete search history.

(56) References Cited

U.S. PATENT DOCUMENTS

| 5,508,578 A * | 4/1996 | Suzuki et al. ............... 310/194 |
| 2007/0063600 A1* | 3/2007 | Fujii et al. ................... 310/71 |
| 2011/0103981 A1* | 5/2011 | Horng et al. ............ 417/423.7 |

\* cited by examiner

*Primary Examiner* — Charles Freay
*Assistant Examiner* — Patrick Hamo

(57) ABSTRACT

A waterproof and dustproof fan motor structure includes a base, an annular enclosure, and a stator assembly. The base has a vertically forward extended bearing cup; the annular enclosure internally defines a closed annular space and is externally fitted around the bearing cup; and the stator assembly is disposed in the closed annular space of the enclosure. The waterproof and dustproof fan motor structure can be assembled to a frame and a rotor assembly to complete a fan. With the stator assembly disposed in the closed annular space of the enclosure, the fan motor is protected against damage caused by moisture and dust, and the stator assembly can be easily removed from the closed annular space for necessary maintenance and repair to thereby reduce the bad yield and the manufacturing cost of fan and fan motor.

6 Claims, 4 Drawing Sheets

WATERPROOF AND DUSTPROOF FAN MOTOR STRUCTURE AND FAN USING THE SAME

FIELD OF THE INVENTION

The present invention relates to a waterproof and dustproof fan motor structure and a fan using the same; and more particularly to a waterproof and dustproof fan motor structure and a fan using the same that are able to protect the fan motor against damage caused by external moisture and dust.

BACKGROUND OF THE INVENTION

A fan is one of the best choices for forcefully carrying away heat produced by a heat-producing element in an electronic device, and has very good heat dissipation effect. The fan usually includes a frame, a stator, and a rotor. The stator and the rotor are mounted in the frame. The stator includes coils, silicon steel plates and a support, and is connected to a circuit board. When the stator and the rotor are excited, the rotor is brought to rotate. In the conventional fan, the stator and the circuit board are exposed to ambient air, and are therefore subject to damage and failure caused by the moisture and dust in the ambient air.

To overcome the problem of damaged stator and circuit board caused by moisture and dust, the stator is coated with a protective layer and accordingly isolated from air, so as to achieve the purpose of guarding the fan motor against water and dust. However, the following problems are found with the conventional stator coated with the protective layer: (1) heat produced by the stator is completely sealed inside the protective layer and could not be dissipated into external environment, resulting in an overheated stator, which might stop operating or even become damaged; and (2) the protective layer is directly wrapped on an outer surface of the stator and components thereof, preventing a damaged stator from being easily removed from the protective layer for replacement.

It is therefore tried by the inventor to develop an improved waterproof and dustproof fan motor structure and fan using the same, in order to overcome the problems existed in the conventional fan motor structure.

SUMMARY OF THE INVENTION

A primary object of the present invention is to provide a waterproof and dustproof fan motor structure, so as to protect the fan motor against damage caused by external moisture and dust.

Another object of the present invention is to provide a fan with waterproof and dustproof fan motor structure, so that components in the fan motor of the fan are protected against damage caused by external moisture and dust.

To achieve the above and other objects, the waterproof and dustproof fan motor structure according to the present invention includes a base, an annular enclosure, and a stator assembly. The base has a vertically forward extended bearing cup; the annular enclosure internally defines a closed annular space and is externally fitted around the bearing cup; and the stator assembly is disposed in the closed annular space of the enclosure.

To achieve the above and other objects, the fan with waterproof and dustproof fan motor structure according to the present invention includes a frame; a fan motor having a base, an annular enclosure and a stator assembly; and a rotor assembly. The base includes a plurality of outward extended arms connected to the frame, and the rotor assembly is rotatably connected to a bearing fitted in a bearing cup formed on the base.

With the stator assembly disposed in the closed annular space of the enclosure, the stator assembly is protected against damage caused by external moisture and dust and can be conveniently removed out of the enclosure for necessary maintenance and repair to thereby reduce the bad yield and the manufacturing cost of the fan motor.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
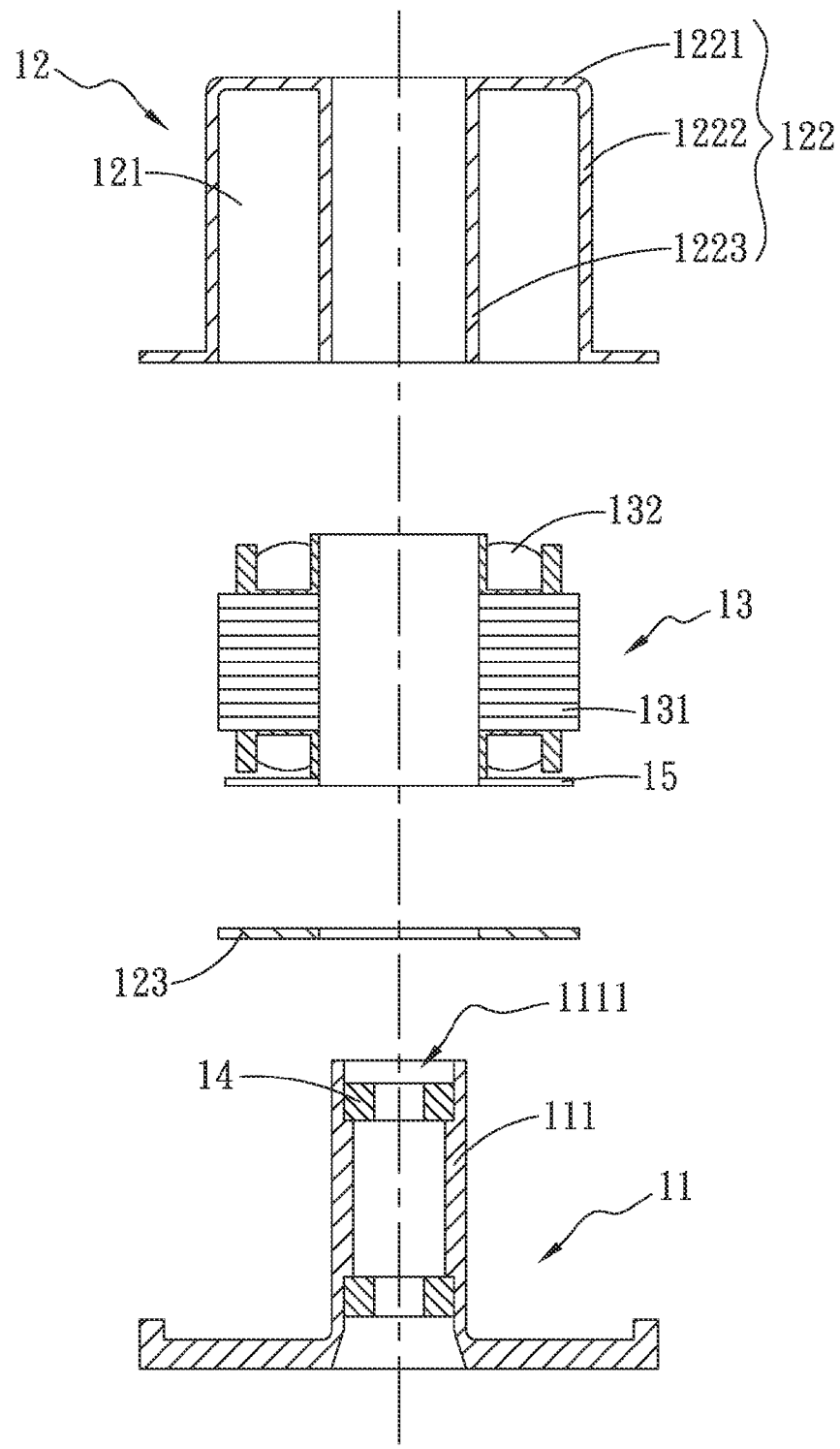
FIG. 1 is an exploded sectional view of a waterproof and dustproof fan motor structure according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
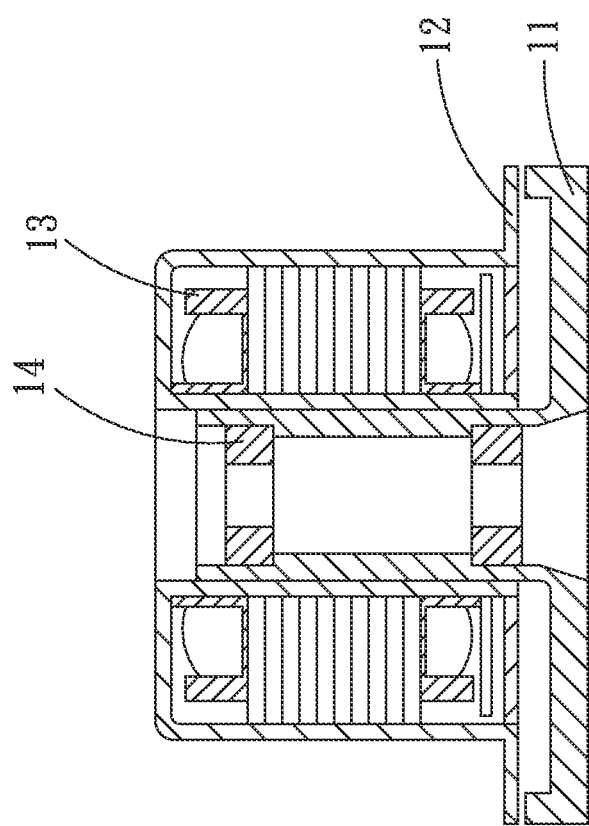
FIG. 2 is an assembled view of FIG. 1.

Please refer to FIGS. 1 and 2 that are exploded and assembled sectional views, respectively, of a waterproof and dustproof fan motor structure according to a first embodiment of the present invention. For the purpose of conciseness, the waterproof and dustproof fan motor structure of the present invention is also briefly referred to as "the fan motor" herein. As shown, the fan motor includes a base 11, an annular enclosure 12, and a stator assembly 13.

The base 11 includes a vertically forward extended bearing cup 111 internally defining an axial space 1111 for receiving at least one bearing 14 therein.

The enclosure 12 defines a closed annular space 121, and is externally fitted around the bearing cup 111. The enclosure 12 includes an annular cover portion 122 and an annular closure portion 123 openably closed to a rear open end of the cover portion 122, so that the cover portion 122 and the closure portion 123 together define the above-mentioned closed annular space 121 therebetween. The cover portion 122 includes an annular top 1221, and a first and a second sidewall 1222, 1223 respectively rearward extended from an outer and an inner circumferential edge of the annular top 1221 toward the base 11, such that the top 1221 is located opposite to the base 11 and the first sidewall 1222 is located opposite to the second sidewall 1223. More specifically, the top 1221 and the base 11 along with the first and the second sidewall 1222, 1223 define the closed annular space 121.

The stator assembly 13 is disposed in the closed annular space 121, and includes a plurality of silicon steel plates 131, which are wound by a plurality of coils 132. The stator assembly 13 is connected at an end to a circuit board 15.

Figure 3:
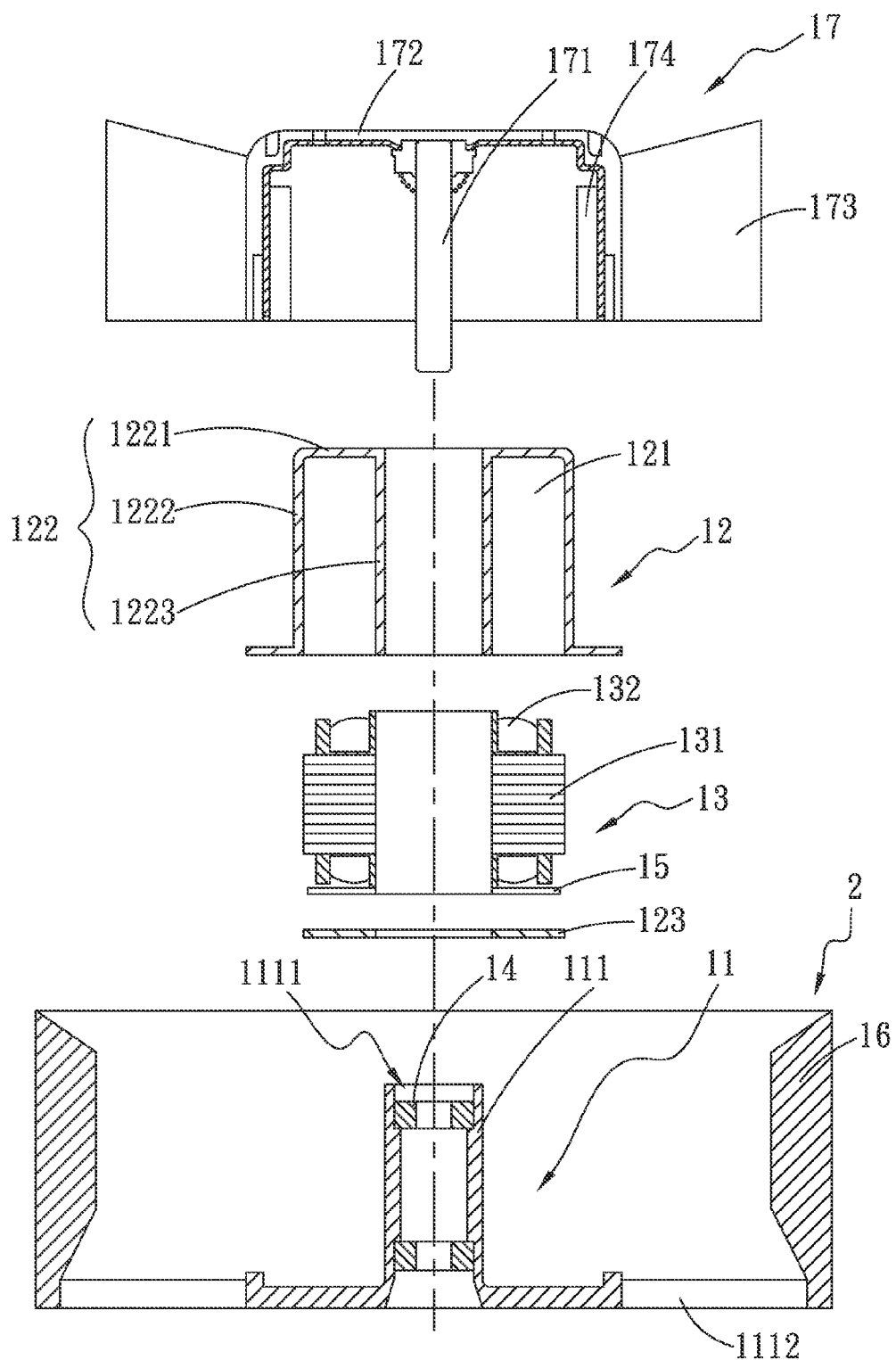
FIG. 3 is an exploded sectional view of a fan with waterproof and dustproof fan motor structure according to a second embodiment of the present invention.
Figure 4:
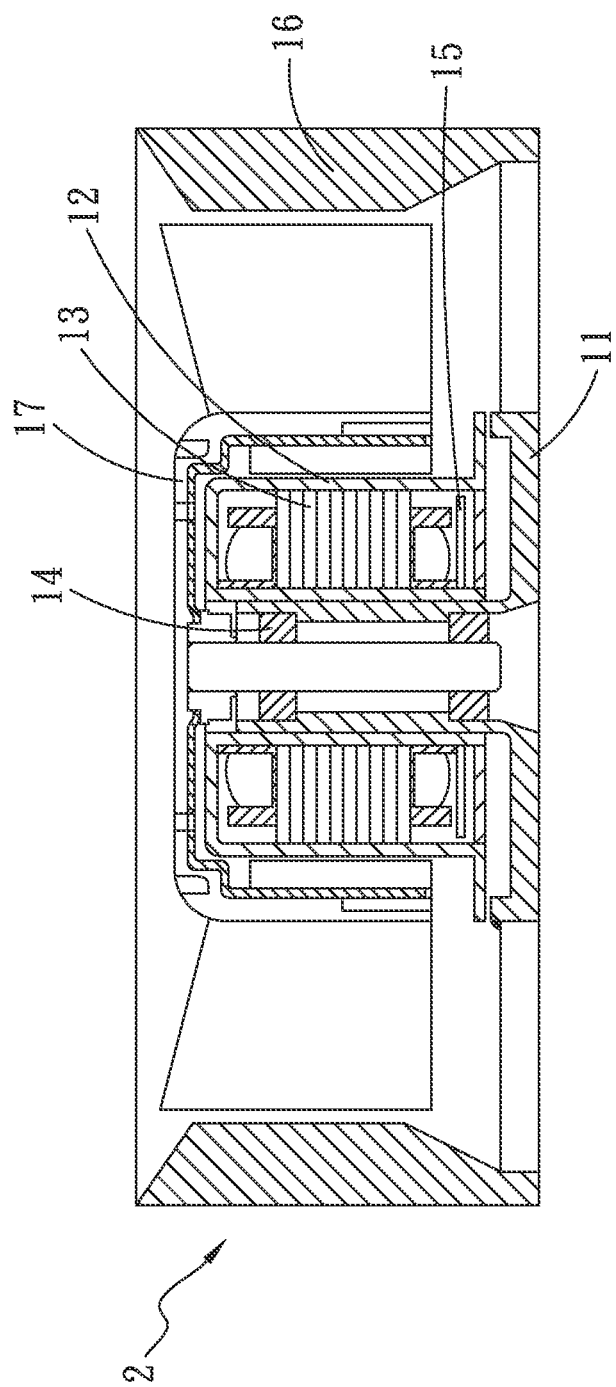
FIG. 4 is an assembled view of FIG. 3.

Please refer to FIGS. 3 and 4 that are exploded and assembled sectional views, respectively, of a fan with waterproof and dustproof fan motor structure according to a second embodiment of the present invention. As shown, the fan includes a fan motor having a base 11, an annular enclosure 12 and a stator assembly 13; a frame 16; and a rotor assembly 17.

Since the fan motor for the fan according to the second embodiment of the present invention is structurally identical to the fan motor according to the first embodiment of the present invention, it is not described in details herein. The fan motor is connected to the frame 16 via a plurality of arms 1112 extended from an outer surface of the bearing cup 111 on the base 11, such that the base 11 and the frame 16 together form a housing 2 of the fan. The rotor assembly 17 is rotatably connected to the bearing 14.

The rotor assembly 17 includes a shaft 171, a hub 172, a plurality of blades 173, and a magnetic element 174 internally disposed around the hub 172. The shaft 171 has an end connected to the hub 172 and another end inserted into the bearing cup 111 to rotatably connect to the bearing 14. The blades 173 are spaced along an outer surface of the hub 172.

In the first and second embodiments of the present invention, the stator assembly 13 and the circuit board 15 are received in the closed annular space 121 of the enclosure 12, and are therefore protected against damage caused by external moisture and dust. In the prior art fan motor, the stator and the circuit board are completely wrapped and sealed in a plastic shell formed by injection molding. In the case the stator and the circuit board are to be replaced, the plastic shell sealing the stator and the circuit board must be broken and removed to cause inconvenience in the replacement of the stator and the circuit board. Further, in the prior art, since the plastic shell is tightly wrapped over the whole stator and circuit board, heat produced by the stator tends to accumulate within the plastic shell. To improve the prior art fan motor, the fan motor according to the present invention includes the annular enclosure 12 for receiving the stator assembly 13 and the circuit board 15 in the closed annular space 121 of the enclosure 12; and the enclosure 12 is assembled from the cover portion 122 and the closure portion 123. A user can open or close the closed annular space 121 by removing or closing the closure portion 123 from or to the cover portion 122, so that the stator assembly 13 and the circuit board 15 can be conveniently replaced at any time. It is noted the enclosure 12 is not configured to tightly and fully bear on the stator assembly 13 and the circuit board 15 disposed in the closed annular space 121, so that there is still clearance or space left between the enclosure 12 and the stator assembly 13 and the circuit board 15. Heat produced by the stator assembly can be radiated and transferred to the enclosure 12 and then dissipated from the enclosure into ambient air.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A waterproof and dustproof fan motor structure, comprising:
    a base having a vertically forward extended bearing cup;
    an annular enclosure comprising a cover portion and an annular closure portion, the closure portion being openably closed to a rear open end of the cover portion, so that the cover portion and the closure portion together define a closed annular space in the enclosure, said closed annular space and being externally fitted around the bearing cup,
    wherein the cover portion includes an annular top, and a first and a second sidewall respectively rearward extended from an outer and an inner circumferential edge of the annular top toward the base, such that the annular top is located opposite to the base and the first sidewall is located opposite to the second sidewall, and the top, the base, and the first and second sidewalls together define the closed annular space in the enclosure; and
    a stator assembly being disposed in the closed annular space.

2. The waterproof and dustproof fan motor structure as claimed in claim 1, wherein the stator assembly includes a plurality of silicon steel plates, a plurality of coils wound around the silicon steel plates, and a circuit board connected to an end of the stator assembly.

3. The waterproof and dustproof fan motor structure as claimed in claim 1, wherein the bearing cup internally defines an axial space for receiving at least one bearing therein.

4. A fan with waterproof and dustproof fan motor structure, comprising:
    a frame;
    a base having a vertically forward extended bearing cup for receiving at least one bearing therein; the bearing cup being provided on an outer surface with a plurality of outward extended arms to connect to the frame;
    an annular enclosure comprising a cover portion and an annular closure portion, the closure portion being openably closed to a rear open end of the cover portion, so that the cover portion and the closure portion together define a closed annular space in the enclosure, said closed annular space and being externally fitted around the bearing cup;
    wherein the cover portion includes an annular top, and a first and a second sidewall respectively rearward extended from an outer and an inner circumferential edge of the annular top toward the base, such that the annular top is located opposite to the base and the first sidewall is located opposite to the second sidewall, and the top, the base, and the first and second sidewalls together define the closed annular space in the enclosure; and
    a stator assembly being disposed in the closed annular space; and
    a rotor assembly being rotatably connected to the bearing.

5. The fan with waterproof and dustproof fan motor structure as claimed in claim 4, wherein the stator assembly includes a plurality of silicon steel plates, a plurality of coils wound around the silicon steel plates, and a circuit board connected to an end of the stator assembly.

6. The fan with waterproof and dustproof fan motor structure as claimed in claim 4, wherein the rotor assembly includes a shaft; a hub having an end inserted into the bearing cup to rotatably connect to the bearing and another end connected to the hub; a plurality of blades spaced along an outer surface of the hub; and a magnetic element internally disposed around the hub.

* * * * *